(12) United States Patent
Vaquero et al.

(10) Patent No.: US 10,884,758 B2
(45) Date of Patent: Jan. 5, 2021

(54) METHOD, APPARATUS, AND SYSTEM FOR PROPAGATING PCIE HOT RESET ACROSS A NON-TRANSPARENT BRIDGE ON A PCIE ADD-IN CARD

(71) Applicant: Intel Corporation, Santa Clara, CA (US)

(72) Inventors: Georges Manuel Faure Vaquero, Heredia (CR); John Cruz Mejia, Hillsboro, OR (US); Scott M. Rider, Beaverton, OR (US); David M. Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 15/640,524

(22) Filed: Jul. 1, 2017

(65) Prior Publication Data

US 2018/0321948 A1 Nov. 8, 2018

Related U.S. Application Data

(60) Provisional application No. 62/502,033, filed on May 5, 2017.

(51) Int. Cl.
| | | |
|---|---|---|
| *G06F 11/00* | (2006.01) | |
| *G06F 9/4401* | (2018.01) | |
| *G06F 11/14* | (2006.01) | |
| *G06F 11/30* | (2006.01) | |
| *G06F 11/07* | (2006.01) | |
| *G06F 13/00* | (2006.01) | |

(52) U.S. Cl.
CPC ........ *G06F 9/4413* (2013.01); *G06F 11/0736* (2013.01); *G06F 11/0745* (2013.01); *G06F 11/0793* (2013.01); *G06F 11/1417* (2013.01); *G06F 11/3041* (2013.01); *G06F 11/3051* (2013.01); *G06F 11/3055* (2013.01); *G06F 13/00* (2013.01)

(58) Field of Classification Search
CPC ............... G06F 9/4413; G06F 11/0736; G06F 11/0745; G06F 11/0793; G06F 11/1417; G06F 11/3041; G06F 11/3051; G06F 11/3055; G06F 13/00
See application file for complete search history.

(56) References Cited

U.S. PATENT DOCUMENTS

2015/0254093 A1* 9/2015 Ho ....................... G06F 9/45558 718/1
2016/0321155 A1* 11/2016 Hirano ................ G06F 13/4022

\* cited by examiner

*Primary Examiner* — Joshua P Lottich
(74) *Attorney, Agent, or Firm* — Alliance IP, LLC

(57) ABSTRACT

Aspects of the embodiments are directed to propagating an in-band hot reset through an add-in card compliant with a peripheral component interconnect express (PCIe) protocol. A host system can transmit an in-band hot reset to the add-in card across a link compliant with the PCIe protocol. A non-transparent bridge (NTB) on the add-in card can receive the in-band hot reset and reset configuration registers on the NTB. A system management controller can poll the NTB register values to determine that the polled configuration registers are different from expected values stored on an electrically erasable programmable random access memory (EEPROM). The SMC can signal a warm reset to a peripheral component based on the determination that the polled configuration register value is different from the expected register value.

23 Claims, 9 Drawing Sheets

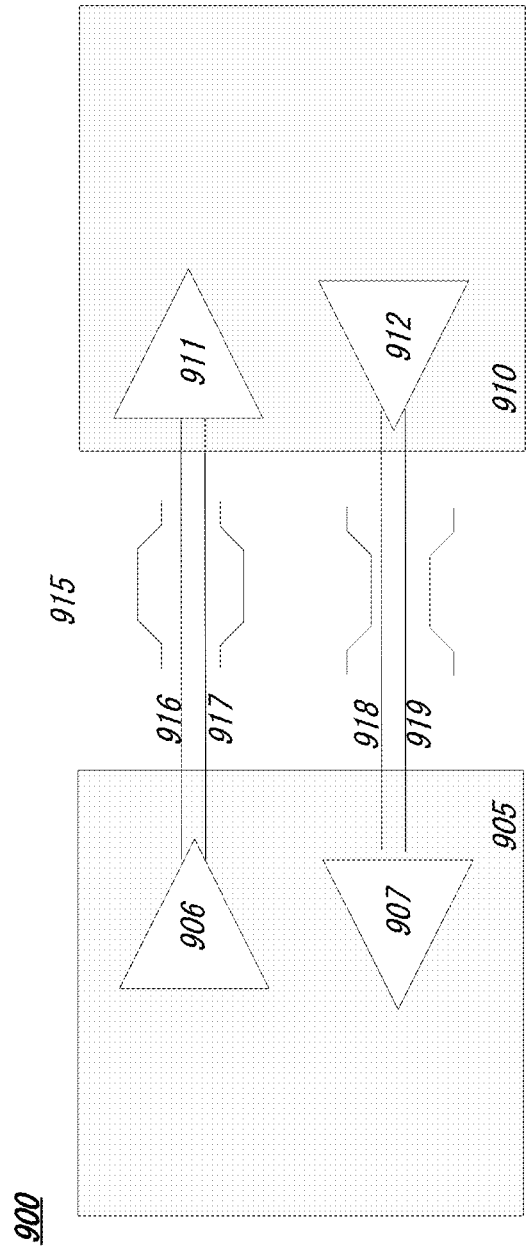

US 10,884,758 B2

METHOD, APPARATUS, AND SYSTEM FOR PROPAGATING PCIE HOT RESET ACROSS A NON-TRANSPARENT BRIDGE ON A PCIE ADD-IN CARD

CROSS REFERENCE TO RELATED APPLICATION

This application claims the benefit pursuant to 35 U.S.C. § 119(e) to U.S. Provisional patent applications having U.S. Ser. No. 62/502,033, filed on May 5, 2017, the entirety of which are incorporated by reference herein.

FIELD

This disclosure pertains to computing systems, and in particular (but not exclusively) to propagating PCIe hot reset signals across a non-transparent bridge on a PCIe add-in card.

BACKGROUND

Peripheral components can be connected to host processors through edge connectors. Such peripheral components can communicate with host processor using a communications interface that is compliant with the Peripheral Component Interconnect Express (PCIe) protocol. A hot reset instruction can be provided by the host processor to the add-in card through the PCIe interface.

BRIEF DESCRIPTION OF THE DRAWINGS

FIG. 8 illustrates an embodiment of a request or packet to be generated or received within an interconnect architecture.

FIG. 9 illustrates an embodiment of a transmitter and receiver pair for an interconnect architecture.

DETAILED DESCRIPTION

Figure 1:
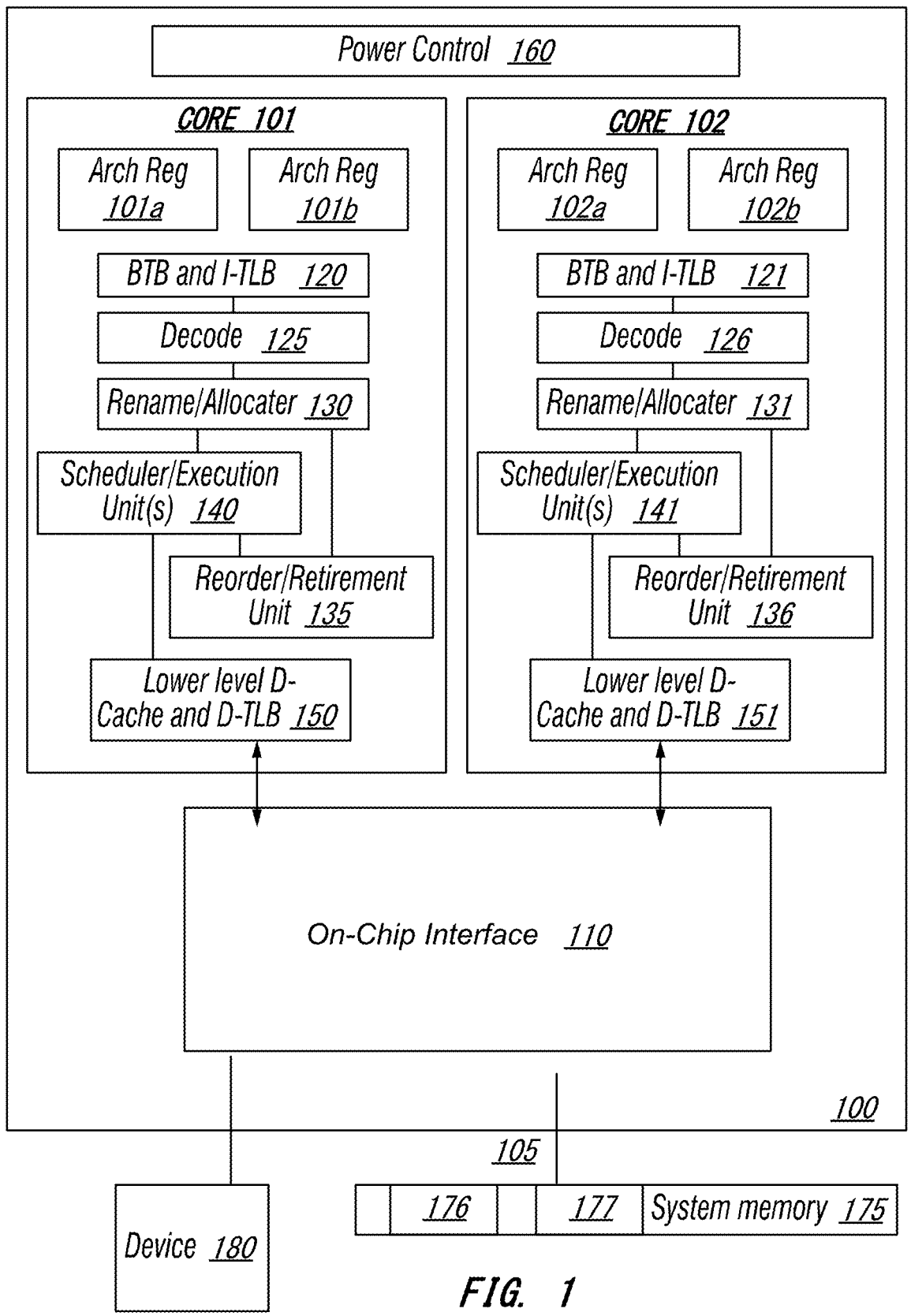
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure.

It will be apparent, however, to one skilled in the art that these specific details need not be employed to practice the present disclosure. In other instances, well known components or methods, such as specific and alternative processor architectures, specific logic circuits/for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

FIG. 1

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores-core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache-last cache in the memory hierarchy on processor 100—such as a second or third level data cache. However, higher level cache is not so limited, as it may be associated with or include an instruction cache. A trace cache-a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

The PCIe protocol indicates that add-in cards should support in-band PCIe hot reset propagation, resulting in a warm reset to the add-in card. On an add-in card compliant with the PCIe protocol, such as an add-in card with a co-processor, a non-transparent bridge (NTB) element compliant with the PCIe protocol may be used that is unable to propagate an in-band PCIe hot reset from a connected host processor. This disclosure describes systems, methods, and apparatuses to propagate the PCIe hot reset, even if the PCIe NTB element onboard the add-in card does not support in-band hot reset propagation and the functionality of the card requires using the PCIe reset.

Figure 2:
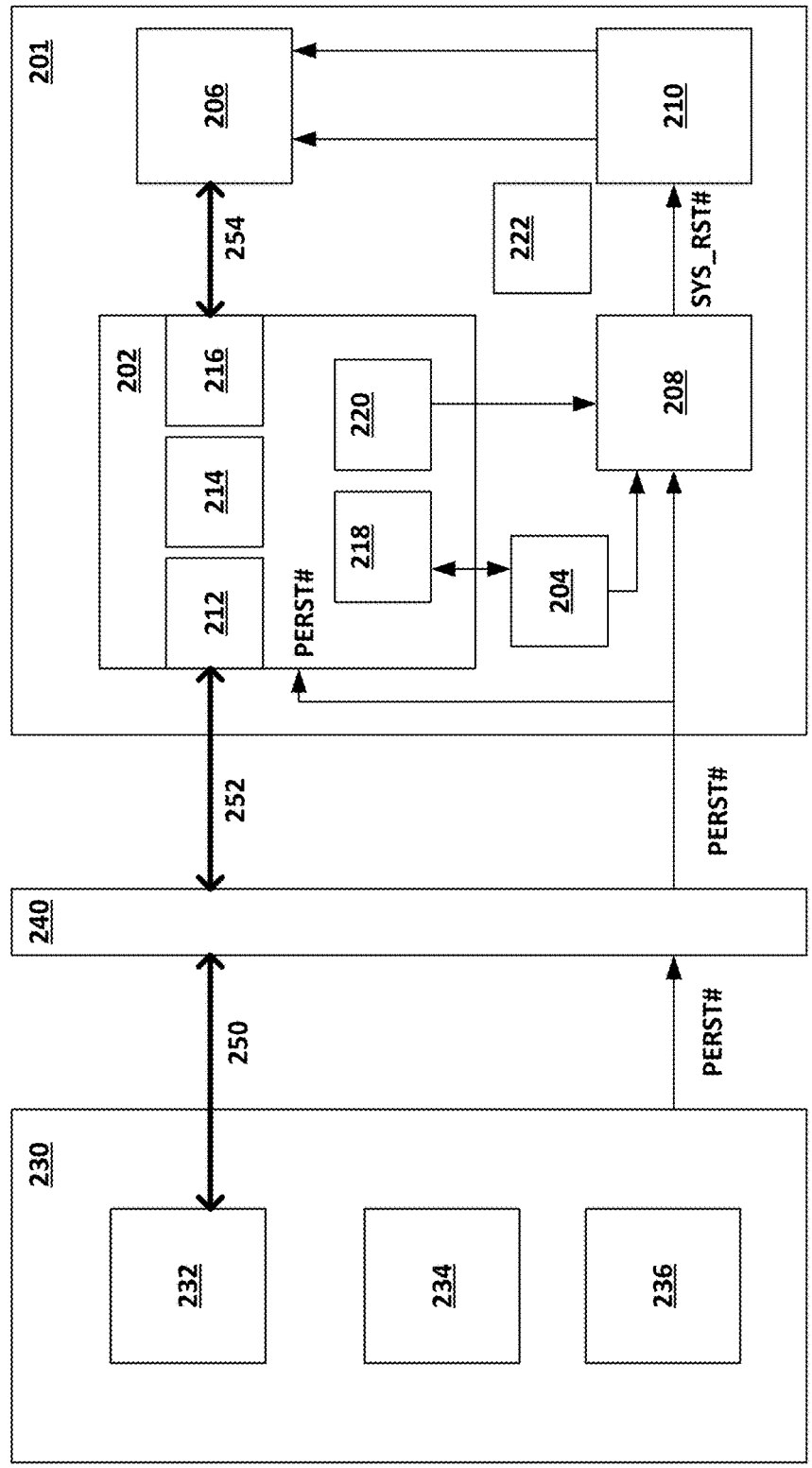
FIG. 2 is a schematic block diagram of a PCIe add-in card connected to a host processor in accordance with embodiments of the present disclosure.

FIG. 2 is a schematic block diagram of a PCIe add-in card 201 connected to a host processor in accordance with embodiments of the present disclosure. The PCIe add-in card 201 can be connected to a host 230 by an edge connector 240. The PCIe add-in card can include a non-transparent bridge 202, a system management controller (SMC) 204, and a co-processor 206. Additionally, the add-in card 201 can include a platform controller hub (PCH) 210 and a programmable logic device (PLD) 208. Though shown as a single add-in card 201, it is understood that multiple add-in cards can be connected to host 230 by multiple edge connectors across a PCIe compliant link (such as 16 lane PCIe links 250 and 252).

The PCIe add-in card 201 can be circuit board that includes one or more circuit components. For example, the PCIe add-in card 201 can include a hardware co-processor 206 that provides additional processing resources for the host processor. The PCIe add-in card 201 can be coupled to the host system 230 by an edge connector 240 that is compliant with the PCIe interconnect protocol. The host 230 can communicate with the add-in card 201 across a PCIe compliant interface 250 and 252.

The NTB element 202 can be coupled to the host 230 by an interface 250-252 compliant with the PCIe protocol. The NTB circuit element 202 can include a PCIe switch 212, a non-transparent virtual end point 214 and a non-transparent link endpoint 216. The NTB element 202 can communicate with the PLD 208 via a general purpose input/output (GPIO) 220.

The PCIe add-in card 201 can include a non-transparent bridge (NTB) 202. The PCIe compliant NTB 202 is a hardware and/or hardware + software element on the add-in card 201 that serves as a point-to-point PCIe bus connecting the host 230 with the co-processor 206. The NTB 202 can provide electrical isolation between the host system 230 and the co-processor 206. Each side of the NTB 202 has its own independent address domain. The host 230 on one side of the NTB 202 will not have the visibility of the complete memory or I/O space on the add-co-processor 206 side of the NTB 202. To communicate across the NTB 202, each NTB endpoint has one (or more) endpoints exposed to the local system. For example, the NTB 202 includes a host-side virtual endpoint 214, and the NTB 202 includes a co-processor side link endpoint 216. Writes to these endpoints are mirrored to memory on the remote system.

The NTB 202 also includes a switch 212 that is compliant with the PCIe protocol. The switch 212 can provide switching functionality for incoming and outgoing packets. The switch 212 can direct incoming packets, such as an in-band hot reset packet, to the host-side virtual endpoint 214.

The NTB 202 can communicate with the co-processor 206 across a link 254 that is compliant with the PCIe protocol. The link 254 can include 16 lanes and can be similar to links 250 and 252.

The NTB 202 can also include an I2C interface 218. The I2C interface 218 can communicate directly with the system management controller (SMC) 204. The SMC 204 functionality is described in more detail below. The I2C interface 218 provides the SMC 204 an interface for polling registers of the NTB 202 and for correcting registers bits after a reset message is processed.

The NTB 202 can also include one or more general purpose input/output (GPIO) circuit elements 220. GPIO 220 can be an interface between the programmable logic device (PLD) 208 and the NTB 202. The PLD 208 can receive the PERST# from the host 230 and provide the PERST# to the NTB 202 and to other circuit elements of the add-in card 201, such as the PCH 210. PCH 210 can communicate with co-processor 206. For example, SMC 204 can provide electrical signals to PCH 210 for causing the co-processor to enter a warm reset based on an in-band hot reset message being received at the host-side endpoint 214 of the NTB 202.

The host system 230 can include a hardware processor 232 that can provide processing resources to a computing system or other computer-based system. The host 230 can include a PCH 234. PCH 234 can control certain data paths and support functions used in conjunction with the processor 232. These functions include, but are not limited to, clocking, and display and media interfaces. The PCH 210 can perform similar functions for the add-in card 201. The host system 230 also includes a programmable logic device (PLD) 236. The PLD 236 can transmit a PCIe reset value (PERST#) to the add-in card 201 (e.g., through PLD 208 through the edge card 240).

When the PCIe NTB 202 receives a PCIe in-band hot reset message from the host CPU 232, the endpoint 214 facing the host CPU 232 gets reset along with all non-sticky state elements. On the attached PCIe add-in card 201, a microcontroller acting as a System Management Controller (SMC) 204 is connected to the PCIe NTB 202 via an I2C interface 218.

The SMC 204 can detect a PCIe hot reset on the host facing endpoint 214 by monitoring (e.g., polling) the current value of the previously programmed DID/SID PCIE NTB element registers. If these registers revert to their reset value, then a PCIe hot reset has occurred. In response, the SMC 204 will handle the system generated reset request by resetting components behind the NTB element 202. For instance, and without limiting the scope of this disclosure, the SMC 204 can generate a co-processor CPU 206 warm reset by asserting the SYS_RESET# signal to the card platform controller hub (PCH) 210, thereby taking the rest of the card through a warm reset as the host system intended. The SMC 204 can also reprogram the DID/SID for the NTB 202 from values stored in EEPROM 222.

By using the SMC 204 on the PCIe add-in card 201, this disclosure avoids using a portion of the co-processor CPU 206 execution bandwidth to monitor the PCIe NTB 202 DID/SID registers. Additionally, this disclosure does not require any dedicated hardware, i.e., changes to the detection algorithm can be easily made via SMC firmware edits.

This disclosure simplifies the logic design and potentially reduces component counts by replacing dedicated reset circuitry with a customizable reset algorithm running on the SMC.

Figure 3:
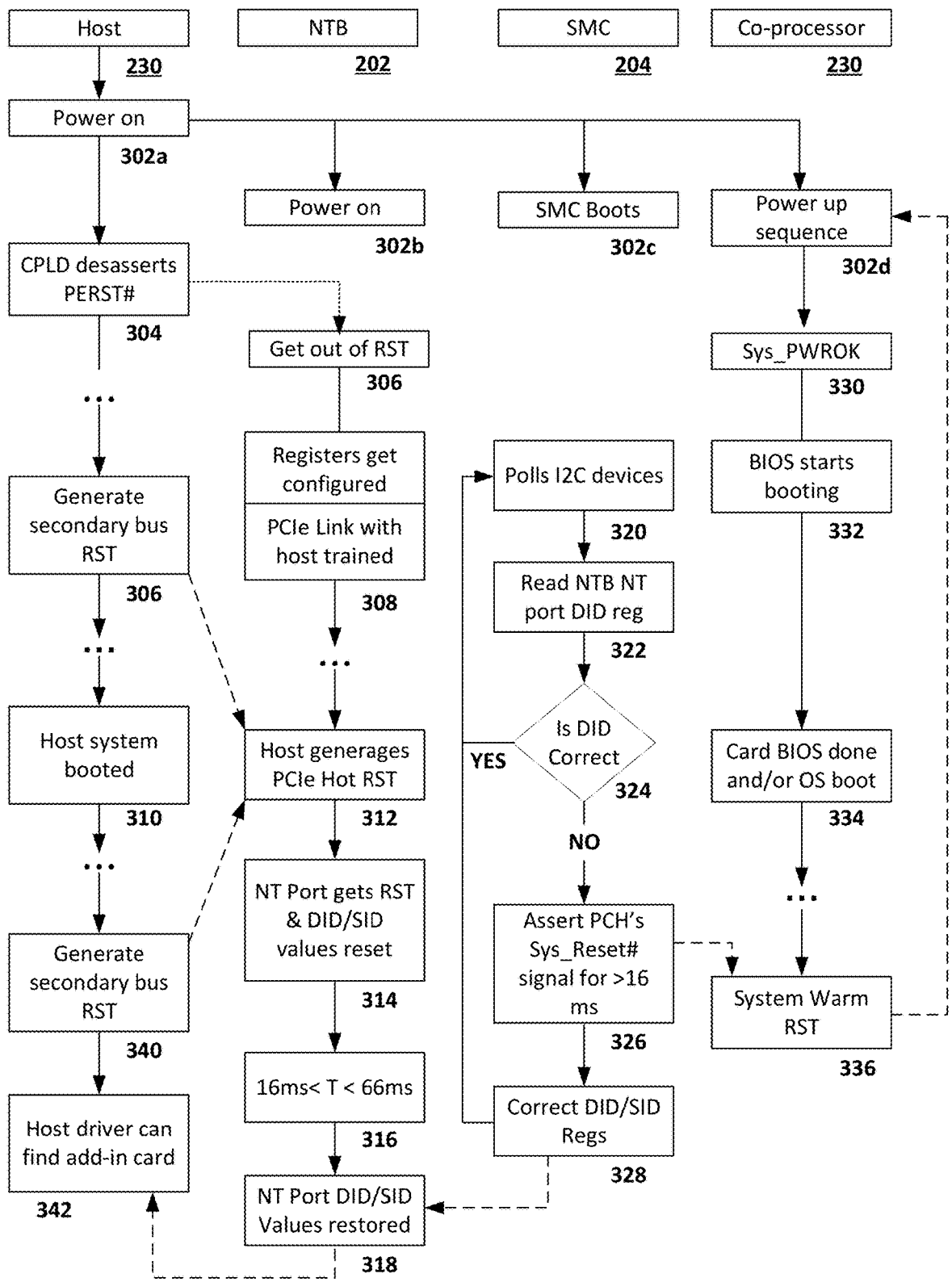
FIG. 3 is a process flow diagram illustrating communications between system components in accordance with embodiments of the present disclosure.

FIG. 3 is a process flow diagram 300 for propagating PCIe hot reset across a non-transparent bridge on a PCIe add-in card in accordance with embodiments of the present disclosure. The host system 230 can power on (302a), which can cause the components of the add-in card to power on (e.g., NTB 202 can power on (302b), SMC can boot up (302c), and the co-processor can undergo a power-up sequence (302d)). The host 230 can deassert a PERST# across the PCIe link to the NTB 202 in the add-in card (304). The NTB 202 can exit reset based on the de-assertion of the PERST#. As part of the discovery process of the add-in card, the NTB registers can be programmed and the PCIe link trained (308). The co-processor 206 can undergo a system initialization via SYS_PWROK# (330). The co-processor BIOS can also boot (332) and the co-processor OS can boot (334). At this point, the add-in card 201 can have been discovered by the host 230 and can provide co-processor resources for the host 230.

At some point in time, the host 230 can generate an in-band hot reset (306) (e.g., when training the PCIe link (308)). The PCIe specification indicates that the add-in cards support this type of reset. Upon generating the in-band hot reset, the host 230 can undergo a system reboot (310).

On the add-in card 201, in some implementations, the PCIe NTB 202 gets reset (312) but the co-processor 206 on the link-side endpoint 216 of the add-in card 201 does not. When the PCIe NTB 202 gets reset, the NTB 202 loses the preconfigured Device ID (DID) and Subsystem ID (SID) values (314). The NTB 202 can wait a predetermined time period (e.g., 16 ms<T<66 ms) (316).

As mentioned above, the NTB 202 can lose its configuration settings during the in-band reset. During normal operation, a PCIe device (e.g., add-in card 201) has unique identifier values either fixed or programmed into it, so that the host system 230 can identify what kind of card is plugged into the host system 230. During a reset, the NTB 202 can reset the device ID. The add-in card 201, therefore, can appear to the host system 230 as a NTB device instead of an add-in card that is simply using an NTB element. The SMC 204 of the present disclosure can reprogram the configuration NTB 202 to appear to the host system 230 as the intended peripheral.

The SMC 204 can poll the PCIe NTB 202 DID and SID registers (320) to be able to read and detect an in-band reset by determining whether the DID and/or SID register values are correct or expected (322). The registers value are compared against the expected value (324). The expected value is acquired from the EEPROM 222 used to program the NTB element 202.

When the registers are detected to be different from the expected value, the SMC 204 generates a warm reset to the co-processor card 206 (336) and reprograms the registers of PCIe NTB 202 using the values obtained from the EEPROM 222 (328). The NTB DID/SID values are restored (318). After the NTB DID/SID values are restored, the host 230 can rediscover the co-processor 206 on the add-in card 201 (342). If the registers are detected to be the same as the expected value, the SMC can continue polling the NTB (320).

When the co-processor receives a warm reset (336), the co-processor can undergo a reboot sequence (302d).

Figure 4:
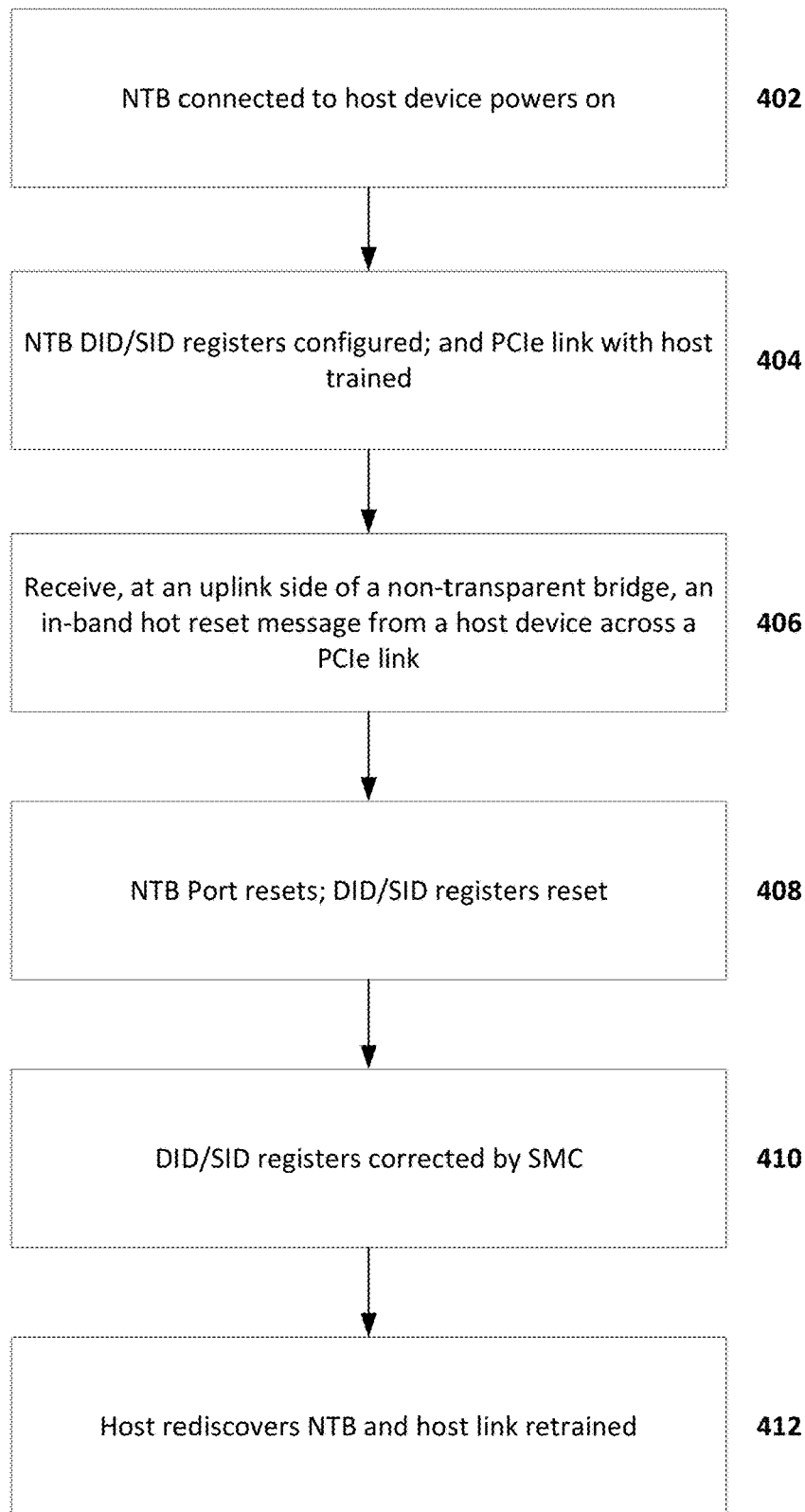
FIG. 4 is a process flow diagram of a non-transparent bridge on a PCIe add-in card in accordance with embodiments of the present disclosure.

FIG. 4 is a process flow diagram 400 of a non-transparent bridge (NTB) on a PCIe add-in card in accordance with embodiments of the present disclosure. At the outset, the NTB can power on as part of a host power up sequence (402). The NTB device ID (DID) and subsystem ID (SID) can be configured using values stored in the EEPROM of the add-in card; and the PCIe link with the host can be trained (404). The NTB can receive, at a host-side endpoint and across a PCIe link, an in-band hot reset from the host (406). Upon receiving the in-band hot reset message, the NTB can reset DID/SID register values as part of the NTB reset (408).

The DID/SID registers can be corrected/reconfigured by the SMC using values stored in the EEPROM of the add-in card (410). The NTB can be rediscovered as an NTB that is part of a PCIe add-in card based on the corrected registers (412).

Figure 5:
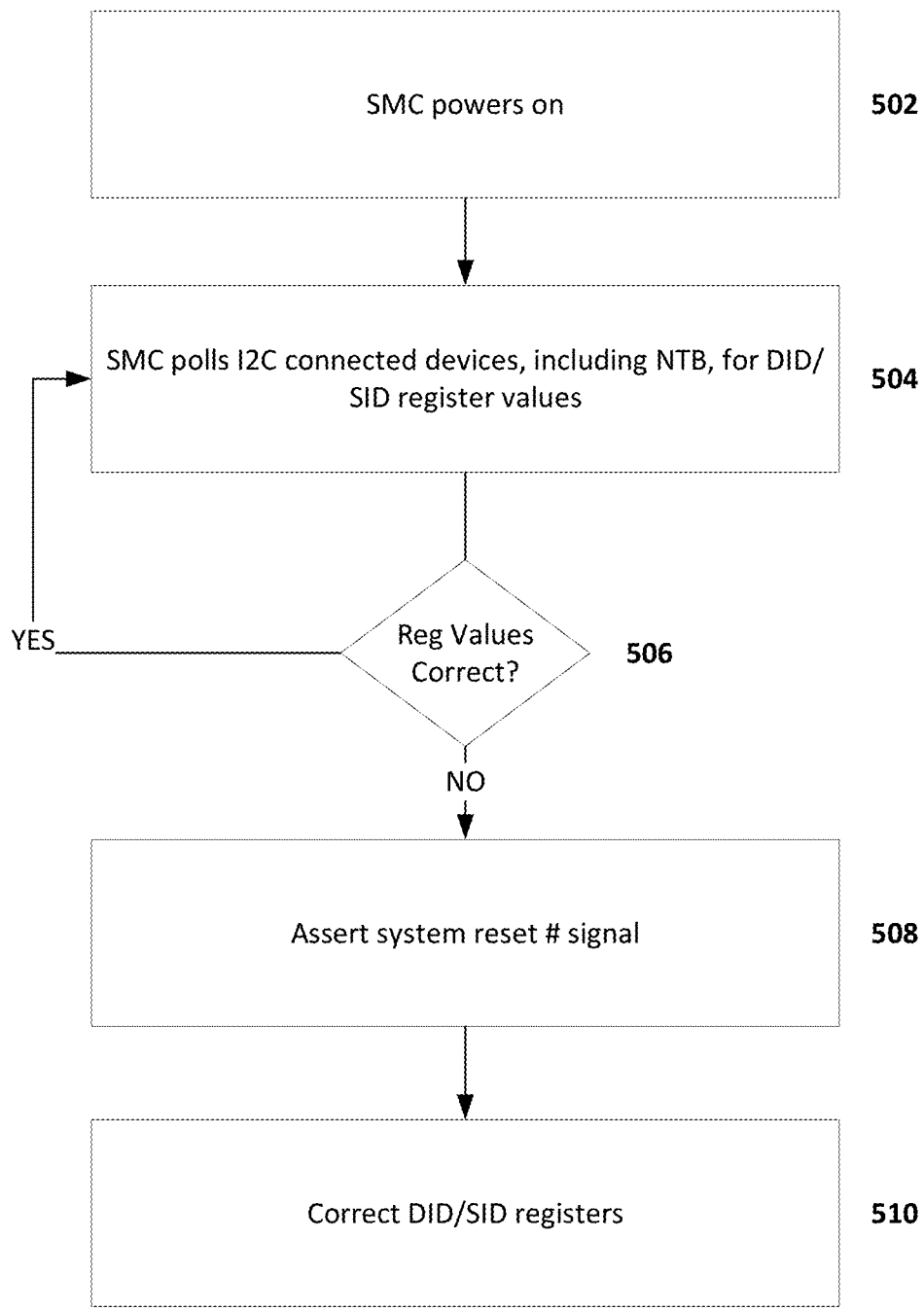
FIG. 5 is a process flow diagram of a system management controller on a PCIe add-in card in accordance with embodiments of the present disclosure.

FIG. 5 is a process flow diagram 500 of a system management controller (SMC) of a PCIe add-in card in accordance with embodiments of the present disclosure. The SMC can power on as part of a host power-up sequence (502). After a predetermined amount of time to allow for the NTB to become configured, the SMC can poll the NTB DID/SID register values (504). The SMC can compare the NTB DID/SID register values against expected values in EEPROM (506). If the polled register values are the same as the expected values, then the SMC can continue polling (504). If the polled register values are different from the expected values, then the SMC can assert a system reset signal to the co-processor (508). The SMC can then correct the NTB DID/SID register values based on the corresponding DID/SID register values stored in EEPROM (510). By correcting the NTB DID/SID register values, the SMC can reconfigure the NTB and the add-in card in general to be discovered by the host as the intended peripheral.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
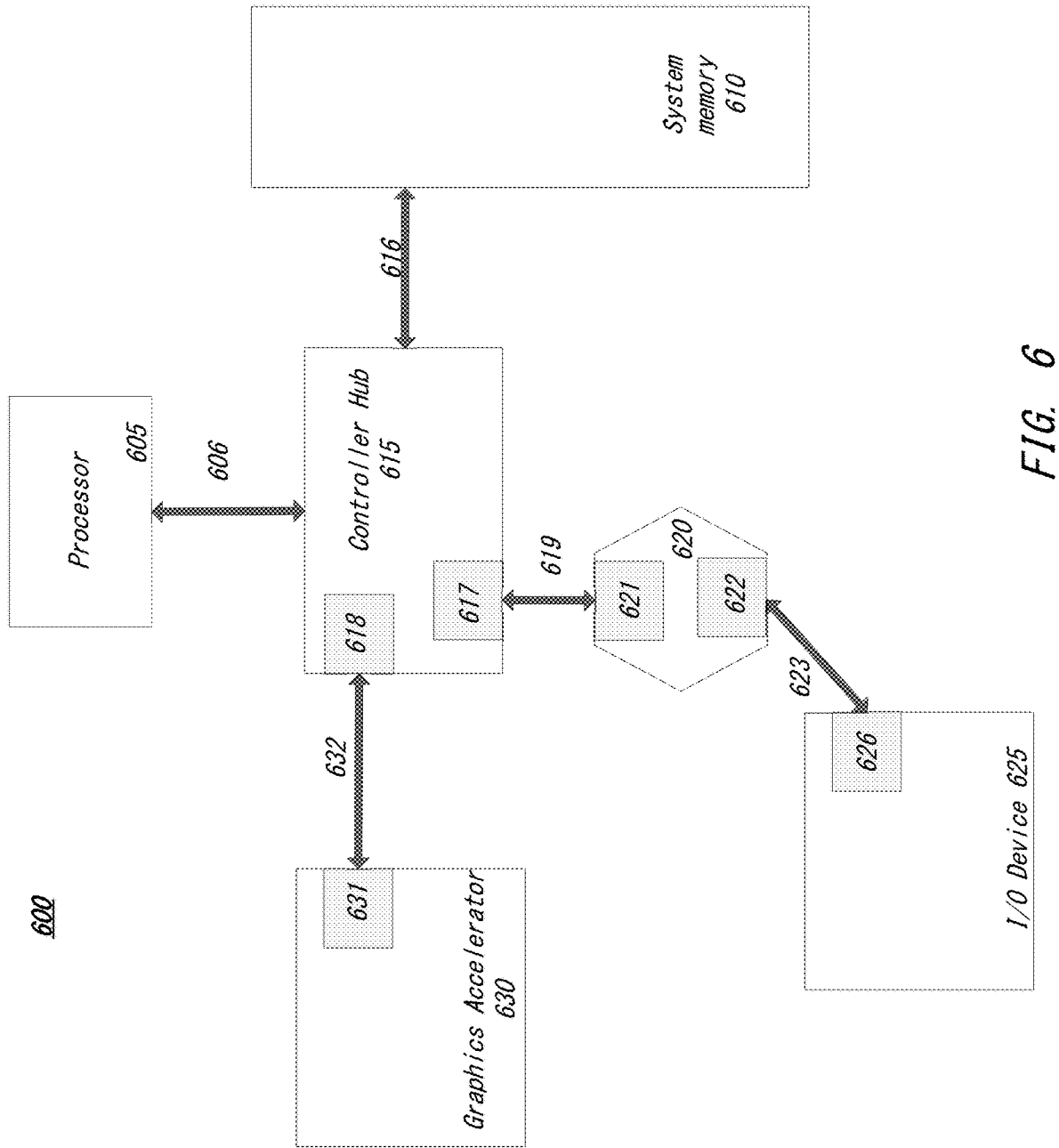
FIG. 6 illustrates an embodiment of a computing system including an interconnect architecture.

Referring to FIG. 6, an embodiment of a fabric composed of point-to-point Links that interconnect a set of components is illustrated. System 600 includes processor 405 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
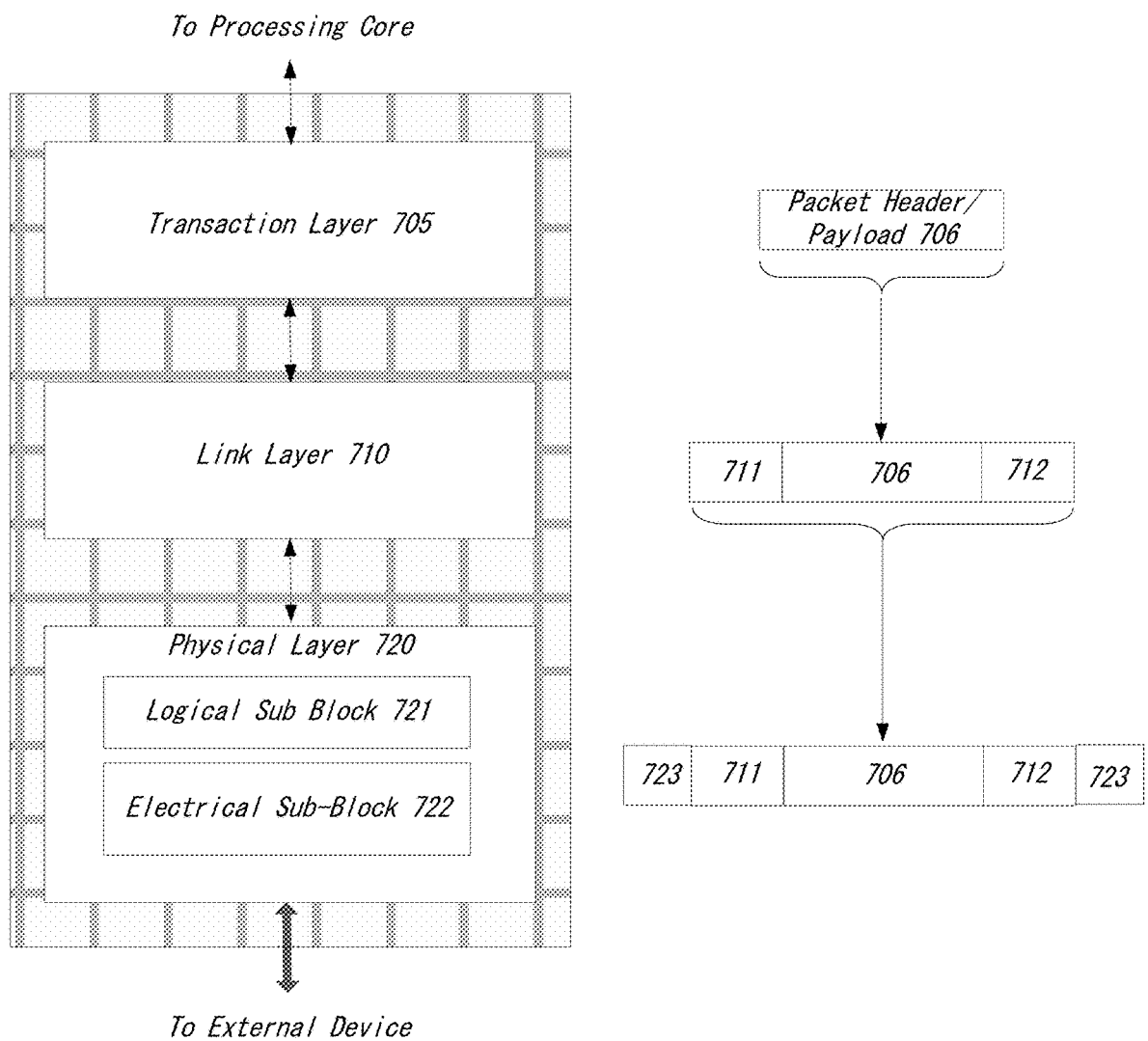
FIG. 7 illustrates an embodiment of an interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 615 in FIG. 6, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted including local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8 b/10 b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 432. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 10:
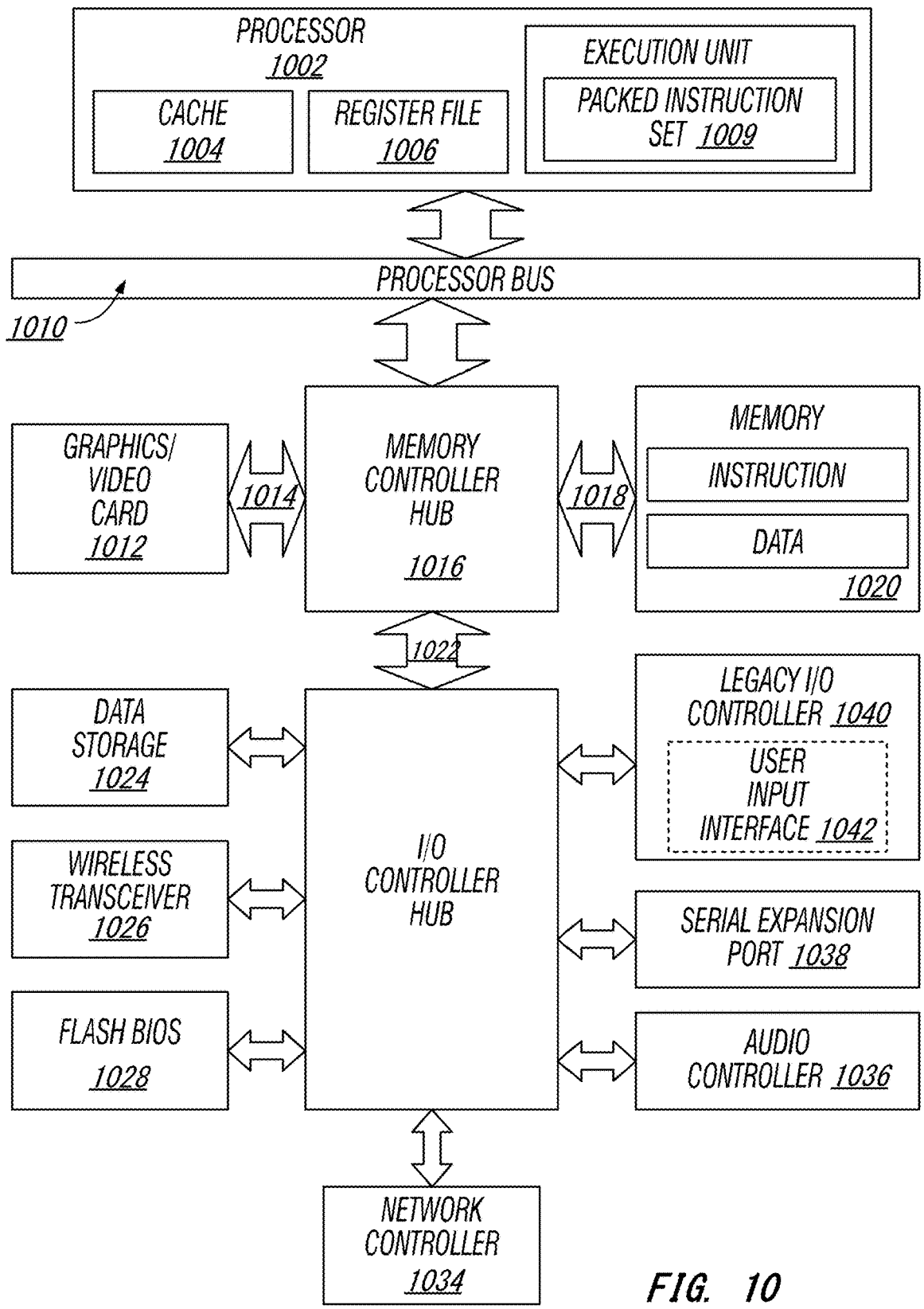
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can include a hard disk drive, a floppy disk drive, a CD-ROM device, a flash memory device, or other mass storage device.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 is an apparatus compliant with a peripheral component interconnect express (PCIe) protocol, the apparatus including a processor; a non-transparent bridge (NTB); and a system management controller communicably coupled to the processor and the non-transparent bridge. The system management controller to poll a register value on the NTB; determine that the register is incorrect; and trigger a warm reset of the processor.

Example 2 may include the subject matter of example 1, wherein the apparatus is coupled to a host processor across an interface compliant with the PCIe protocol.

Example 3 may include the subject matter of example 2, wherein the apparatus receives from the host processor an in-band hot reset message, wherein the in-band hot reset message changes the register value.

Example 4 may include the subject matter of example 3, wherein the system management controller is configured to obtain a correct register value from an electrically erasable programmable read only memory (EEPROM); and program the register with the correct register value obtained from the EEPROM.

Example 5 may include the subject matter of any of examples 1-4, wherein the system management controller is configured to determine that the NTB register value is incorrect by comparing the polled NTB register value with an expected register value stored in an electrically erasable programmable read only memory (EEPROM).

Example 6 may include the subject matter of any of examples 1-5, wherein the register value polled by the system management controller includes one or both of a device identifier (DID) or a subsystem identifier (SID) associated with the processor on the add-in card.

Example 7 is a method performed at a system management controller of an add-in card compliant with a peripheral component interconnect express (PCIe) protocol, the method including monitoring a register bit value of a non-transparent bridge residing on the add-in card; determining that the register bit value is different than an expected value; and signaling a warm reset to a processor on the add-in card.

Example 8 may include the subject matter of example 7, wherein the register bit value is one or both of a device identifier (DID) or a subsystem identifier (SID) associated with the processor on the add-in card.

Example 9 may include the subject matter of any of examples 7-8, further including obtaining a correct register value from an electrically erasable programmable read only memory (EEPROM) on the add-in card; and programming the non-transparent bridge with the correct register value obtained from the EEPROM.

Example 10 may include the subject matter of any of examples 7-9, wherein determining that the NTB register value is different from an expected register value by comparing the monitored NTB register value with an expected register value stored in an electrically erasable programmable read only memory (EEPROM).

Example 11 is a system management controller (SMC) residing on an add-in card compliant with a peripheral component interconnect express (PCIe) protocol, the SMC including one or more non-transitory computer-readable media including instructions to cause an apparatus, upon execution of the instructions by one or more processors of the apparatus, to poll a register value on the NTB; determine that the register is incorrect; and trigger a warm reset of the processor.

Example 12 may include the subject matter of example 11, wherein the apparatus is coupled to a host processor across an interface compliant with the PCIe protocol.

Example 13 may include the subject matter of example 12, wherein the apparatus receives from the host processor an in-band hot reset message, wherein the in-band hot reset message changes the register value.

Example 14 may include the subject matter of any of examples 11-13, wherein the system management controller is configured to obtain a correct register value from an electrically erasable programmable read only memory (EEPROM); and program the register with the correct register value obtained from the EEPROM.

Example 15 may include the subject matter of any of examples 11-14, wherein the system management controller is configured to determine that the NTB register value is incorrect by comparing the polled NTB register value with an expected register value stored in an electrically erasable programmable read only memory (EEPROM).

Example 16 may include the subject matter of any of examples 11-16, wherein the register value polled by the system management controller includes one or both of a device identifier (DID) or a subsystem identifier (SID) associated with the processor on the add-in card.

Example 17 is a system including an add-in card including non-transparent bridge (NTB) residing on an add-in card compliant with a peripheral component interconnect express (PCIe) protocol; a system management controller (SMC) residing on the add-in card and in communication with the NTB; and a peripheral component residing on the add-in card. The system includes a host device coupled to the add-in card by an edge connector and in communication with the add-in card by a link compliant with the PCIe protocol; the host device to transmit an in-band hot reset message to the add-in card across the link. The NTB to receive the in-band hot reset message from a host device from across a link compliant with the PCIe protocol; and reset a NTB configuration register value based on receiving the in-band hot reset message. The SMC to monitor the NTB configuration register value, determine that the NTB configuration register value is incorrect; and transmit a warm reset signal to the peripheral component.

Example 18 may include the subject matter of example 17, the system to obtain a correct register value from an electrically erasable programmable read only memory (EEPROM); and program the register with the correct register value obtained from the EEPROM.

Example 19 may include the subject matter of example 18, wherein the NTB is to receive, from the SMC, the correct configuration register value; and reconfigure the NTB based on the corrected configuration register value.

Example 20 may include the subject matter of any of examples 17-19, wherein the SMC is configured to determine that the NTB register value is incorrect by comparing the polled NTB register value with an expected register value stored in an electrically erasable programmable read only memory (EEPROM).

Example 21 may include the subject matter of any of examples 17-20, wherein the register value monitored by the system management controller includes one or both of a device identifier (DID) or a subsystem identifier (SID) associated with the processor on the add-in card.

Example 22 may include the subject matter of any of examples 17-21, the SMC is configured to determine that the NTB register value is incorrect by comparing the polled NTB register value with an expected register value stored in an electrically erasable programmable read only memory (EEPROM).

Example 23 may include the subject matter of any of examples 17-22, wherein the peripheral component includes a co-processor.

What is claimed is:

1. An apparatus compliant with a peripheral component interconnect express (PCIe) protocol, the apparatus comprising:
   a processor;
   a non-transparent bridge (NTB); and
   a system management controller communicably coupled to the processor and the non-transparent bridge, the system management controller to:
      poll a register value on the NTB;
      determine that the register value is incorrect; and
      trigger a warm reset of the processor.

2. The apparatus of claim 1, wherein the apparatus is coupled to a host processor across an interface compliant with the PCIe protocol.

3. The apparatus of claim 2, wherein the apparatus receives from the host processor an in-band hot reset message, wherein the in-band hot reset message changes the register value.

4. The apparatus of claim 3, wherein the system management controller is configured to:
   obtain a correct register value from an electrically erasable programmable read only memory (EEPROM); and
   program a register with the correct register value obtained from the EEPROM.

5. The apparatus of claim 1, wherein the system management controller is configured to determine that the NTB register value is incorrect by comparing the polled NTB register value with an expected register value stored in an electrically erasable programmable read only memory (EEPROM).

6. The apparatus of claim 1, wherein the register value polled by the system management controller comprises one or both of a device identifier (DID) or a subsystem identifier (SID) associated with the processor.

7. A method performed at a system management controller of an add-in card compliant with a peripheral component interconnect express (PCIe) protocol, the method comprising:
   monitoring a register bit value of a non-transparent bridge residing on the add-in card;
   determining that the register bit value is different than an expected value; and
   signaling a warm reset to a processor on the add-in card.

8. The method of claim 7, wherein the register bit value is one or both of a device identifier (DID) or a subsystem identifier (SID) associated with the processor on the add-in card.

9. The method of claim 7, further comprising:
   obtaining a correct register value from an electrically erasable programmable read only memory (EEPROM) on the add-in card; and
   programming the non-transparent bridge with the correct register value obtained from the EEPROM.

10. The method of claim 7, wherein determining that the NTB register value is different from an expected register value by comparing the monitored NTB register value with an expected register value stored in an electrically erasable programmable read only memory (EEPROM).

11. A system management controller (SMC) residing on an add-in card compliant with a peripheral component interconnect express (PCIe) protocol, the SMC comprising one or more non-transitory computer-readable media comprising instructions to cause an apparatus, upon execution of the instructions by one or more processors of the apparatus, to:
   poll a register value on a non-transparent bridge (NTB);
   determine that the register value is incorrect; and
   trigger a warm reset of the processor.

12. The SMC of claim 11, wherein the apparatus is coupled to a host processor across an interface compliant with the PCIe protocol.

13. The SMC of claim 12, wherein the apparatus receives from the host processor an in-band hot reset message, wherein the in-band hot reset message changes the register value.

14. The SMC of claim 11, wherein the system management controller is configured to:
   obtain a correct register value from an electrically erasable programmable read only memory (EEPROM); and
   program the register with the correct register value obtained from the EEPROM.

15. The SMC of claim 11, wherein the register value comprises an NTB register value, and wherein the system management controller is configured to determine that the NTB register value is incorrect by comparing the polled NTB register value with an expected register value stored in an electrically erasable programmable read only memory (EEPROM).

16. The SMC of claim 11, wherein the register value polled by the system management controller comprises one or both of a device identifier (DID) or a subsystem identifier (SID) associated with the processor on the add-in card.

17. A system comprising:
   an add-in card comprising:
      non-transparent bridge (NTB) residing on an add-in card compliant with a peripheral component interconnect express (PCIe) protocol;
      a system management controller (SMC) residing on the add-in card and in communication with the NTB; and
      a peripheral component residing on the add-in card; and
   a host device coupled to the add-in card by an edge connector and in communication with the add-in card by a link compliant with the PCIe protocol;
   the host device to:
      transmit an in-band hot reset message to the add-in card across the link;
   the NTB to:
   receive the in-band hot reset message from a host device from across a link compliant with the PCIe protocol; and
   reset a NTB configuration register value based on receiving the in-band hot reset message;
   the SMC to:
   monitor the NTB configuration register value;
   determine that the NTB configuration register value is incorrect; and
   transmit a warm reset signal to the peripheral component.

18. The system of claim 17, the system to:
   obtain a correct register value from an electrically erasable programmable read only memory (EEPROM); and
   program the register with the correct register value obtained from the EEPROM.

19. The system of claim 18, wherein the NTB is to:
   receive, from the SMC, the correct configuration register value; and
   reconfigure the NTB based on the corrected configuration register value.

20. The system of claim 17, wherein the SMC is configured to determine that the NTB register value is incorrect by comparing the polled NTB register value with an expected register value stored in an electrically erasable programmable read only memory (EEPROM).

21. The system of claim 17, wherein the register value monitored by the system management controller comprises one or both of a device identifier (DID) or a subsystem identifier (SID) associated with the processor on the add-in card.

22. The system of claim 17, SMC is configured to determine that the NTB register value is incorrect by comparing the polled NTB register value with an expected register value stored in an electrically erasable programmable read only memory (EEPROM).

23. The system of claim 17, wherein the peripheral component comprises a co-processor.

* * * * *